US006597397B1

(12) United States Patent
Stephenson et al.

(10) Patent No.: US 6,597,397 B1
(45) Date of Patent: Jul. 22, 2003

(54) DIGITAL STILL CAMERA WITH OPTICAL TAPE

(75) Inventors: Stanley W. Stephenson, Spencerport, NY (US); Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/121,195

(22) Filed: Jul. 22, 1998

(51) Int. Cl.$^7$ .......................... H04N 5/76; H04N 5/225; G11B 7/00; G11B 3/74
(52) U.S. Cl. .............. 348/231.99; 348/375; 369/44.18; 369/97; 369/96
(58) Field of Search ................................ 348/235, 375, 348/373, 46, 231.1, 231.99; 396/315; 369/14, 44.17, 44.18, 111, 97, 44.19, 96; 360/114.01, 114.05, 114.08, 114.02, 114.07

(56) References Cited

U.S. PATENT DOCUMENTS

| 4,541,021 A | | 9/1985 | Konishi et al. |
| 4,815,067 A | | 3/1989 | Webster et al. |
| 4,970,707 A | * | 11/1990 | Hara et al. ................ 369/44.17 |
| 4,981,772 A | | 1/1991 | Pan et al. |
| 5,264,457 A | | 11/1993 | Adams et al. |
| 5,465,243 A | * | 11/1995 | Boardman et al. .......... 369/114 |
| 5,617,391 A | * | 4/1997 | Ono et al. .................... 369/48 |
| 5,655,164 A | * | 8/1997 | Tsai ........................... 396/315 |
| 5,673,245 A | * | 9/1997 | Yanagawa et al. ....... 369/44.17 |
| 5,802,033 A | * | 9/1998 | Van Rosmalen ............. 369/14 |
| 5,971,281 A | * | 10/1999 | Frary et al. .................... 369/14 |
| 5,982,941 A | * | 11/1999 | Loveridge et al. .......... 382/260 |
| 6,088,319 A | * | 7/2000 | Gudesen ....................... 369/97 |
| 6,172,958 B1 | * | 1/2001 | Mochizuki et al. .......... 369/112 |
| 6,271,876 B1 | * | 8/2001 | McIntyre et al. .............. 348/46 |
| 6,283,646 B1 | * | 9/2001 | Dellert et al. ............... 396/315 |
| 2002/0024529 A1 | * | 2/2002 | Miller et al. ................ 345/690 |

* cited by examiner

Primary Examiner—Wendy R. Garber
Assistant Examiner—Lin Ye
(74) Attorney, Agent, or Firm—Stephen H. Shaw

(57) ABSTRACT

A digital still camera for receiving a optical tape cassette having optical tape including an image sensor for capturing an image; focusing an image of a subject onto the image sensor which in response thereto captures such image; a structure for receiving the optical tape cassette; an optical writer for effecting a change in the optical properties of the optical tape. The optical tape is movable into operative relationship with the optical head; the image sensor and the optical writer causes the optical head write to effect changes in the optical properties of the optical tape in accordance with the image captured by the image sensor.

13 Claims, 3 Drawing Sheets

DIGITAL STILL CAMERA WITH OPTICAL TAPE

FIELD OF THE INVENTION

The present invention relates to digital still cameras which capture and store images.

BACKGROUND OF THE INVENTION

Digital still cameras exist that capture an image with a sensor, and store captured images within the digital still camera. Various media storage systems have been developed that permit the storage of one or more of the capture images in a removable media cassette. The cassettes can hold a flexible ("floppy") or rigid ("hard") rotating disk having a magnetically or optically sensitive coating. U.S. Pat. No. 5,264,457 is one such system, wherein a digital still camera stores captured still images on a removable optical disk.

Digital images are data, and other systems have been disclosed that record data onto writable optical or magnetic tape. Such a method is shown in U.S. Pat. No. 4,541,021. A magnetic tape is stored on two reels, and individual images are recorded in separate areas on the tape. A magnetic head having a plurality of writing elements is used to record digital image information.

Conventional photographic film can be considered an optical media that can stores image information onto light sensitive silver halide grains using an optically focused image. Such grains are limited in recording density compared to an optical tape medium. In the Advanced Photographic System (APS) standard, a removable cassette carries a strip of light sensitive film in a light tight cassette. Features on the film strip and in the cassette permit the film strip to be stored on a single spool. The film is accessed by thrusting the film from the cassette, passing the film through an exposing area and taking the film up onto a take-up spool. The film is advanced for reading or writing an image and the film is wound back into the cassette for removal. The APS cassette has a small size than optical tape spool-to-spool systems, and protects the media using a single spool.

SUMMARY OF THE INVENTION

It is therefore an object of the present invention to provide an efficient storage arrangement for digital still cameras.

This object is achieved in a digital still camera for receiving a optical tape cassette having optical tape comprising:

(a) an image sensor for capturing an image;

(b) optical means for focusing an image of a subject onto the image sensor which in response thereto captures such image;

(c) means for receiving the optical tape cassette;

(d) an optical head including write means for effecting a change in the optical properties of the optical tape;

(e) means coupled to the optical tape cassette for moving such optical tape into operative relationship with the optical head; and (f) means coupled to the image sensor and the optical head write means for causing the optical head write means to effect changes in the optical properties of the optical tape in accordance with the image captured by the image sensor.

It is an advantage of the present invention to provide a digital still camera that can convert images captured by an image sensor into a format which is stored on optical tape.

An important feature of the present invention is that images can be captured on optical tape stored in an optical tape cassette which can readily be inserted and removed from the digital still camera.

It is another advantage of the present invention to provide an improved removable image storage means for a digital still camera that stores multiple digital images in a optical tape cassette. The optical tape cassette can be conventional that protects optical tape from damage. A single recording element is needed to write to the optical phase change on the optical tape. Surface contact problems are eliminated by non-contact writing to the optical tape. High resolution images are written to each frame by micro-stepping the recording head to create a plurality of partial circular tracks. A plurality of frames permits storage of multiple images.

DETAILED DESCRIPTION OF THE INVENTION

Figure 1:
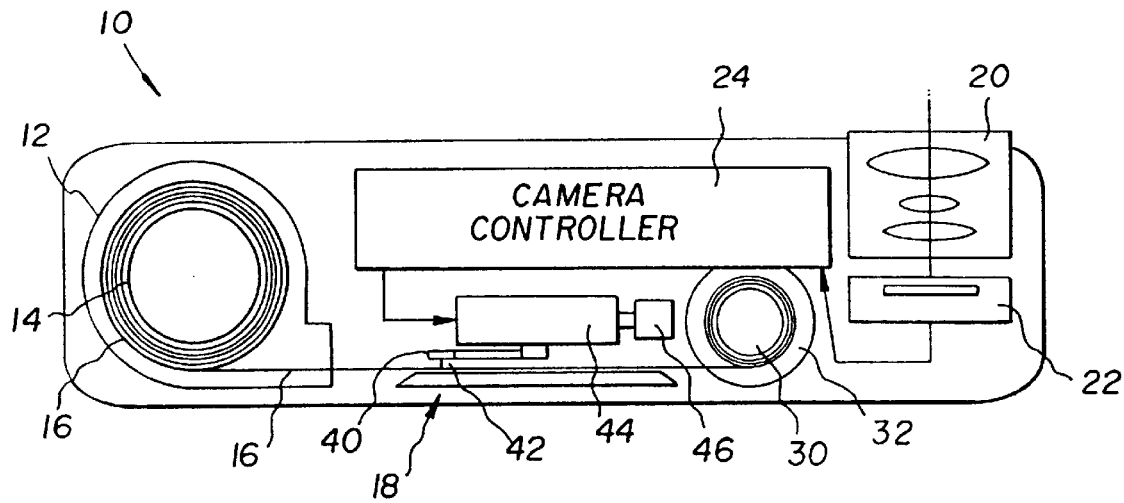
FIG. 1 is a top sectional view of a digital still camera, an optical tape cassette and a writing mechanism.
Figure 2:
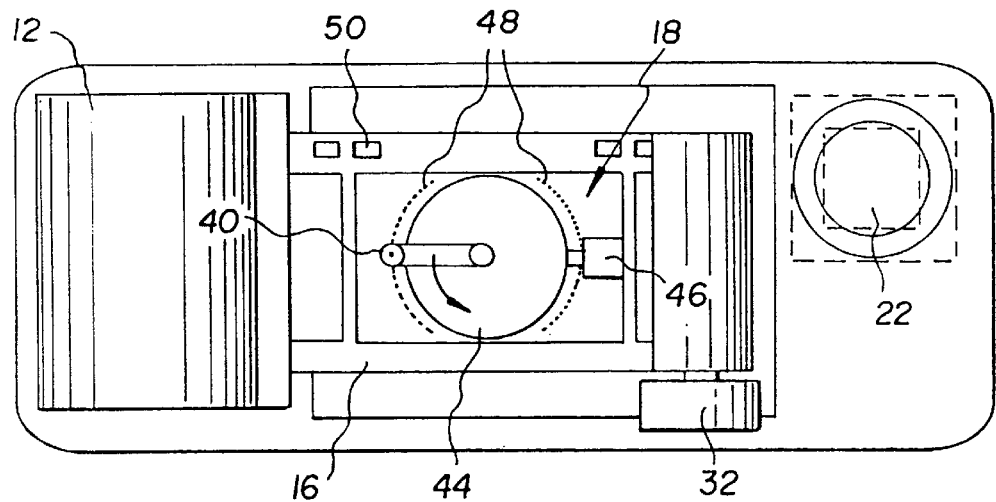
FIG. 2 is a rear view of the digital still camera of FIG. 1.

The present invention is concerned with digital still cameras which use optical tape. Turning now to FIGS. 1 and 2, an optical tape cassette 12 is inserted in a digital still camera 10 according to the present invention. The optical tape cassette 12 stores optical tape which will be discussed in more detail later. It will be understood that the optical tape cassette 12 can have the form and features meeting the specifications for what is known as the Advanced Photographic System (APS). The APS structure has the advantage of protecting an optical tape 16. An important feature of the present invention is that images can be captured on optical tape stored in an optical tape cassette 12 which can readily be inserted and removed from the digital still camera 10. Optical tape cassette 12 has a optical tape cassette spool 14 on which supports optical tape 16.

Optical tape 16 has a film base such as polyethyleneterepthalate (PET) or acetate or similar film support approximated 100 microns thick. An optically written, phase changing material is coated on the surface of optical tape 16 to receive digital data. The phase change media can be an antimony-tin alloy incorporating a third element to facilitate the change from an amorphous to crystalline state, such as set forth in commonly assigned U.S. Pat. No. 4,981,772, the disclosure of which is incorporated herein by reference. Such films can be phase changed with less than 3 milli-watts of energy applied for 50 nano-seconds.

Optical tape 16 permits significantly higher recording densities than a silver halide emulsion. Phase change coatings are not sensitive to light energies associated with recording photographic images, and the new optical tape cassette structure is dedicated to digital image storage alone. The use of phase change optical tape 16 as a replacement for a silver halide coating permits writing resolutions of less than 3 microns, compared with greater than 3 micron for photographic emulsions. The phase change optical tape 16 in the preferred embodiment is designed to record 1 micron diameter bits. In addition, the phase change coating does not require the chemical development which is required for readable silver halide coatings. The phase change coating is uniform and write-only within digital still camera 10 to provide a simple writing mechanism.

The phase change optical tape 16 is opaque, and data are read from the material using the variable reflectance from written track areas. Writing is done by using a 790 mm laser diode which selectively applies a 5 milli-watt pulse to each write area to change reflectance by up to 22%. A conventional optical feedback and servo maintain the focus on the surface of optical tape 16. Optical writing is done non-contact, and has reduced sensitivity to environmental contamination and higher writing resolution.

For a further discussion of optical tapes and structures for writing on such optical tapes see U.S. Pat. No. 4,815,067. This patent discloses an optical tape, which is wrapped around a drum, and writes the data as a series of linear, helical scan tracks on the tape. Such optical write systems require significant volume to accommodate the drum and write electronics.

It is important to protect the surface of optical tape 16. Optical tape 16 can be configured according to the APS specification and stored on optical tape cassette spool 14 for storage. Optical tape cassette 12 keeps optical tape 16 from contact except when in reading and writing apparatus. When optical tape 16 is secured in digital still camera 12, it is thrust from optical tape cassette 12 across a writing area 18 and is taken up by a take-up spool 30. After the initial thrust from optical tape cassette 12, optical tape 16 is pulled by take-up motor 32. Common mechanisms in the art for the APS cassette are disclosed in for thrusting and pulling optical tape 16. In certain cases, a separate motors provide the initial thrust; in other cases, a mechanical coupling permits take-up motor 32 to provide both the initial thrust and take-up drive to optical tape 16.

Images are captured by digital still camera 10 using imager 22 under control of camera controller 24. Imager 22 is a conventional charge coupled device or a CMOS device, having a plurality of imaging sites in an orderly array configured to convert an image focused on the array by imager optics 20 into a set of data representing a captured image. Imager optics 20 are aligned to imager 22 to focus the image on imager 22. Image data from imager 22 is transmitted to camera controller 24, which formats the image data into a format for recording onto optical tape 16.

The take-up motor 32 under the control of camera controller 24 drives the take-up spool 30 to position the optical tape 16 in a recording position under the optical write head 40. Camera controller 24 actuates a write motor 44 to spin optical write head 40 at 1800 revolutions per minute. Data are recorded as a series of 1 micron bits on 18 millimeter diameter data track 48 Megahertz. The 18 mm track diameter permits a compact writing mechanism, and the 1 micron bits provide a fault-tolerant recording. The rotation speed and track diameter permit writing of pixels in 590 nanoseconds. The write time permits data writing at the relatively slow rate of 1.7 megahertz. The optical write head 40 includes a 790 mm laser diode and associated optics that provide a modulated, focused point of energy represented by light beam 42 onto a data track 48 in response to the stored image in response to camera controller 24. Optical write head 40 records a bit of data as a 1 micron phase change to the recording surface on optical tape 16.

A single circular data track 48 is preferable and contains 56,000 bits. That amount of data is insufficient for typical imaging applications. A write displacement actuator 46 is attached to write motor 44 and is driven in response to camera controller 24 to displace write motor 44 to create 100 data tracks 48 per recorded image, with each data track 48 displaced 10 micron. Write displacement actuator 46 can be for instance, a piezo motor or electromagnetic stepper motor that is capable of 30 displacements a second that corresponds to 30 rotations per second of optical write head 40. The 100 tracks are written in 3.3 seconds. The 100 tracks provide 700,000 bytes worth of data, sufficient for many consumer imaging applications.

Using sequentially displaced circular tracks of optically written material permits faster data recording than translation systems which must accelerate and decelerate The one hundred 10-micron steps are generated by write displacement actuator 46 stepping 10 microns for every rotation of optical write head 40. The 100 data tracks 48 are written in 3.3 seconds. Using a single optical write head 40 is significantly less expensive than using multiple magnetic or optical heads. The use of a single optical write head 40 and write displacement actuator 46 to only write to optical tape 16 provides a simple, low cost way for storing digitally captured images in digital still camera 10.

Figure 3:
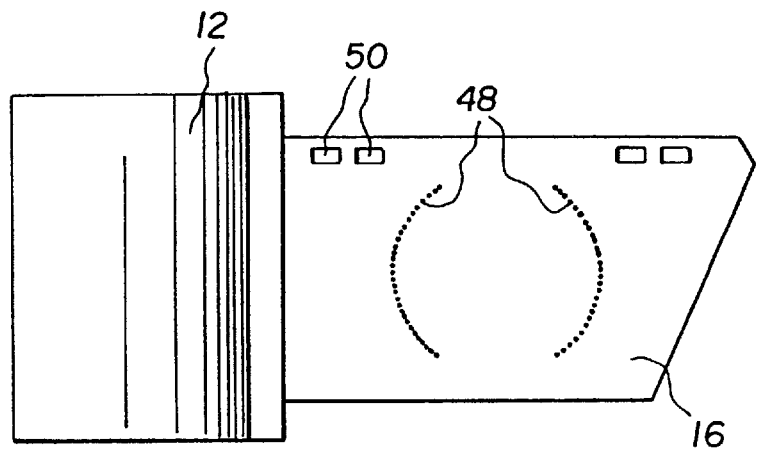
FIG. 3 is a back view of the optical tape cassette of FIG. 1.
Figure 4A:
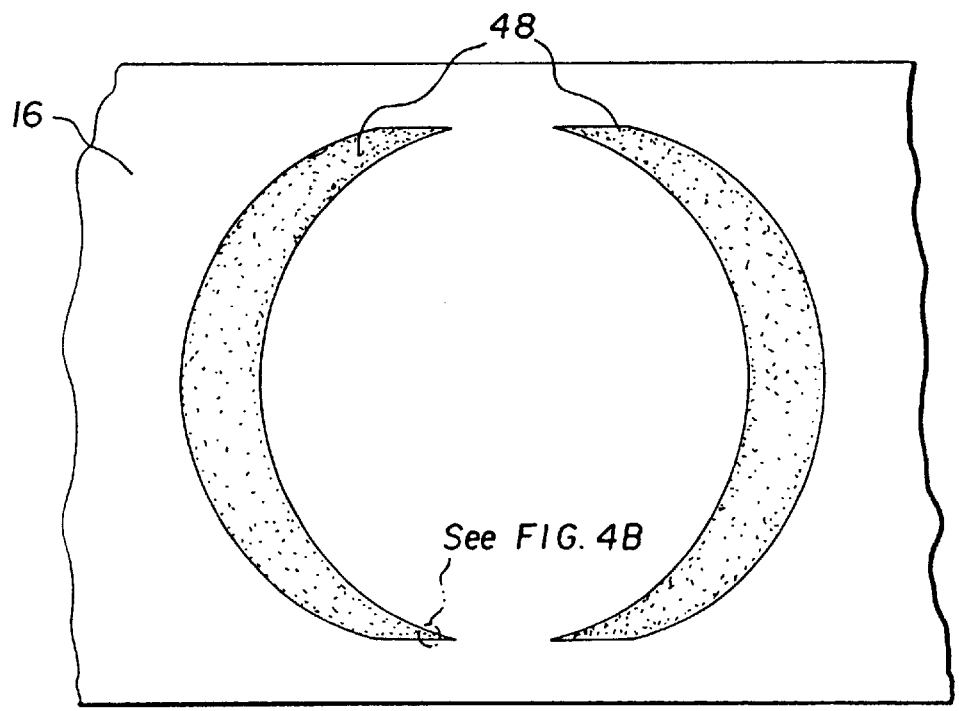
FIG. 4 is a magnified portion of the tape of the optical tape cassette of FIG. 3.
Figure 4B:
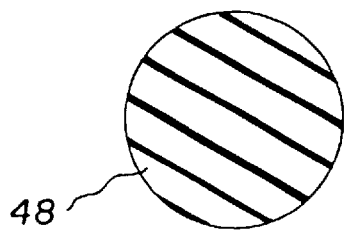

FIGS. 3 and 4 show portions of optical tape cassette 12 and optical tape 16. In FIG. 4, a close up of data tracks 48 shows the convergence of data tracks 48 at the top and bottom of the recorded area. When the tracks converge, recorded data become unreadable. For a 1 micron pixel track, the acceptable data becomes unreadable when data tracks 48 are spaced 2 microns apart. In this embodiment, data are not recorded at the top and bottom 36 degrees of data tracks. The angle of non-recording can be varied depending on track diameter, bit size and the track spacing of data tracks 48. In the exemplary embodiment, the angle of lost data reduces the maximum data capacity of 700,000 bytes of data tracks 48 by 20% to 560,000 bytes.

Optical tape 16 is designed to support a recording area for each captured image. To differentiate each recording area, one or more alignment perforations 50 can be disposed on optical tape 16 to aid detection of each recording area. In the exemplary case, dual perforations corresponding to the perforations in the APS specification are used to delimit each set of image data.

Figure 5:
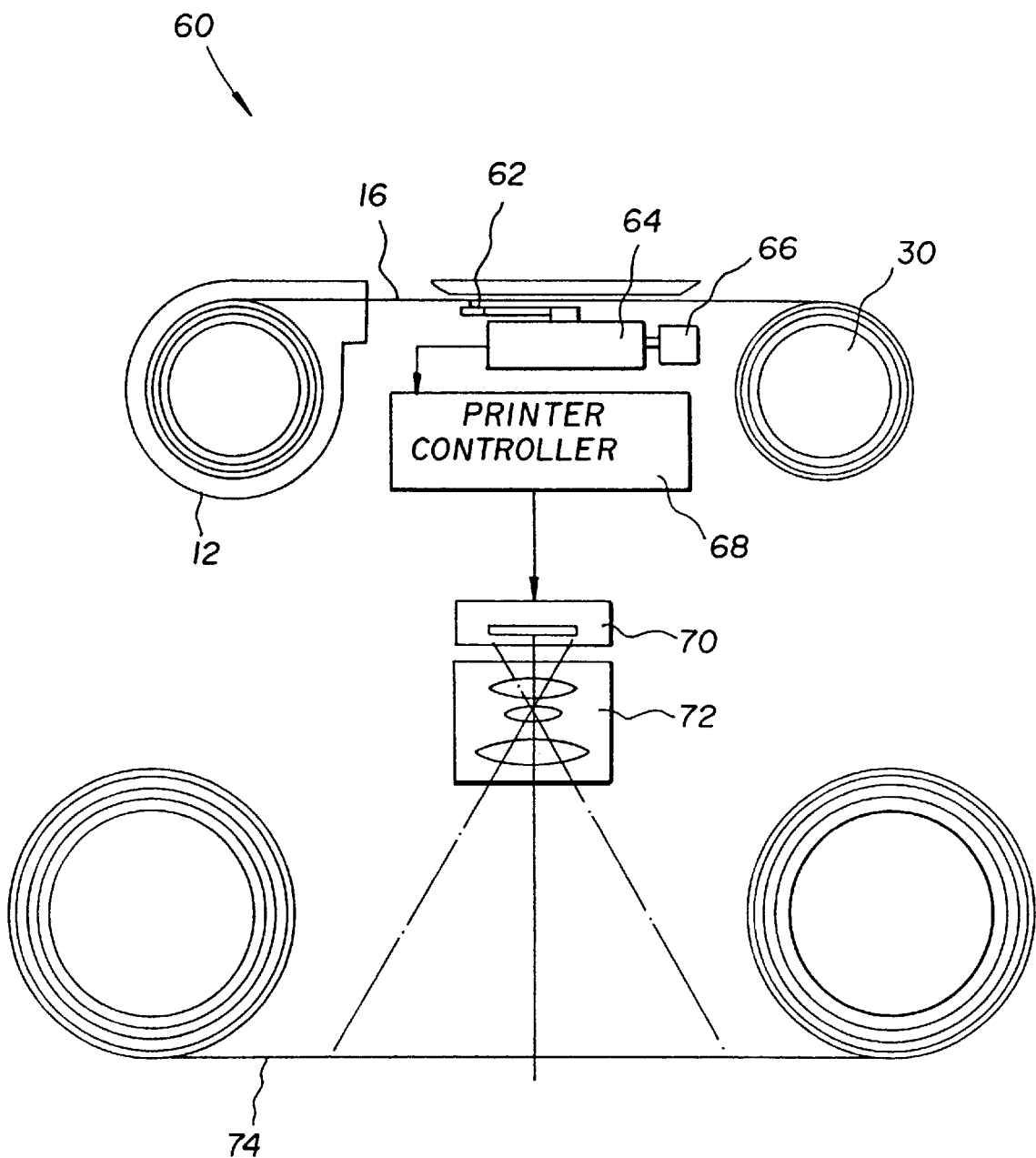
FIG. 5 shows a printer using the optical tape cassette of FIG. 3 to print images from the optical tape cassette of FIG. 3.

FIG. 5 is a side view of a printer for generating images from optical tape cassette 12. Optical tape cassette 12 is held in printer 60 and optical tape 16 is thrust out of optical tape cassette 12 and onto take-up spool 30. An optical read head 62 is spun by read motor 64 to acquire data tracks 48. Read displacement actuator 66 micro-adjusts spinning optical read head 62 to data tracks 48. Writing to optical tape 16 in digital still camera 10 using the proposed write mechanism creates irregular data tracks 48. Conventional processes permit data received from optical read head 62 to be analyzed by printer controller 68 to control displacement actuator 66 and keep optical read head 62 in alignment with data tracks 48.

Printer controller 68 collects the data for a given set of image data and re-constructs the image captured by digital still camera 10. Printer controller 68 loads the image onto display 70. Display 70 can be a liquid crystal display or a cathode ray tube of conventional design. Printer optic 72 focuses the image from display 70 onto print media 74. In this embodiment, print media 74 is conventional silver halide media that is chemically processed after exposure to generate hard copy images from the image data stored in frames of optical tape 16. Optical tape 16 is sequentially advanced to read each image. Print media 74 is advanced to a new printing area along with the advancement of optical tape 16, and the process is repeated until all images on optical tape 16 have been printed.

The invention has been described in detail with particular reference to a certain preferred embodiment thereof, but it will be understood that variations and modifications can be effected within the spirit and scope of the invention.

PARTS LIST

| | |
|---|---|
| 10 | digital still camera |
| 12 | optical tape cassette |
| 14 | optical tape cassette spool |
| 16 | optical tape |
| 18 | writing area |
| 20 | imager optics |
| 22 | imager |
| 24 | camera controller |
| 30 | take-up spool |
| 32 | take-up motor |
| 40 | optical write head |
| 42 | light beam |
| 44 | write motor |
| 46 | write displacement actuator |
| 48 | data tracks |
| 50 | alignment perforations |
| 60 | printer |
| 62 | optical read head |
| 64 | read motor |
| 66 | read displacement actuator |
| 68 | printer controller |
| 70 | display |
| 72 | printer optics |
| 74 | print media |

What is claimed is:

1. A digital still camera for receiving a cassette having optical tape comprising:
   (a) an image sensor for capturing an image;
   (b) optical means for focusing an image of a subject onto the image sensor which in response thereto captures such image;
   (c) means for receiving the optical tape cassette;
   (d) a rotatable optical head including a write motor and an optical write head for writing circular data tracks;
   (e) a write displacement actuator for displacing the rotatable optical head relative to the optical tape to write sequentially displaced circular tracks on the optical tape while the optical tape is stationary in the digital still camera;
   (f) means for advancing the optical tape to place a recording area for each captured image into operative relationship with the optical head; and
   (g) means coupled to the image sensor and the optical write head for causing the optical write head to effect changes in the optical properties of the optical tape in accordance with the image captured by the image sensor.

2. The digital still camera of claim 1 wherein the optical tape includes phase change material.

3. The digital still camera of claim 1 wherein the optical write means includes means for applying high energy light pulses to the optical tape to change its optical properties.

4. The digital still camera of claim 2 wherein the optical write means includes means for applying high energy light pulses to the optical tape to change its optical properties.

5. The digital still camera of claim 1 wherein the optical head write means includes a single laser diode producing a laser beam and means for moving laser light from the laser diode and along an arcuate path relative to the optical tape for recording on tracks of such optical tape.

6. The digital still camera of claim 1 wherein the laser light source includes a single laser diode for producing a laser beam and means for moving the laser beam in arcuate paths for recording on multiple arcuate tracks of the optical tape.

7. The digital still camera claimed in claim 1, wherein the optical tape has one or more alignment perforations disposed on it to aid in detection of an image recording area, and the digital still camera further comprises a sensor for detecting the alignment perforations.

8. The digital still camera claimed in claim 1, wherein the write displacement actuator is a piezo motor.

9. The digital still camera claimed in claim 1, wherein the write displacement actuator is an electromagnetic stepper motor.

10. The digital still camera claimed in claim 1, wherein the optical tape cassette includes a spool about which the optical tape is wound.

11. The digital still camera claimed in claim 1, wherein the rotatable optical head further comprises a laser diode for writing circular data tracks on the optical tape.

12. The digital still camera claimed in claim 1, wherein the digital still camera further includes a take-up motor that drives a single take-up spool to aid in advancing the optical tape.

13. A printer for reading captured images from an optical tape cassette including optical tape, comprising:
   a) a rotatable optical head including a read motor and an optical read head for reading circular data tracks of the optical tape;
   b) a read displacement actuator for displacing the rotatable optical head relative to the optical tape to read sequentially displaced circular tracks on the optical tape while the optical tape is stationary in the printer; and
   c) a printer controller for advancing the optical tape to place a recording area for each captured image into operative relationship with the optical read head.

* * * * *